United States Patent
Birnbaum et al.

(10) Patent No.: US 8,659,571 B2
(45) Date of Patent: *Feb. 25, 2014

(54) INTERACTIVITY MODEL FOR SHARED FEEDBACK ON MOBILE DEVICES

(71) Applicant: Immersion Corporation, San Jose, CA (US)

(72) Inventors: David Birnbaum, San Jose, CA (US); Chris Ullrich, San Jose, CA (US); Jason Short, San Francisco, CA (US); Ryan Devenish, San Francisco, CA (US)

(73) Assignee: Immersion Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/773,191

(22) Filed: Feb. 21, 2013

(65) Prior Publication Data

US 2013/0300683 A1 Nov. 14, 2013

Related U.S. Application Data

(63) Continuation of application No. 13/592,685, filed on Aug. 23, 2012, now Pat. No. 8,493,354.

(51) Int. Cl.
*G06F 3/041* (2006.01)

(52) U.S. Cl.
USPC ........................................ 345/173; 340/407.2

(58) Field of Classification Search
USPC ......... 345/156–184; 178/18.01–18.09, 18.11; 340/4.12, 407.1, 407.2; 463/30
See application file for complete search history.

(56) References Cited

U.S. PATENT DOCUMENTS

| | | | | |
|---|---|---|---|---|
| 5,666,499 A * | 9/1997 | Baudel et al. | ................ | 715/808 |
| 5,825,308 A * | 10/1998 | Rosenberg | ................ | 341/20 |
| 6,061,004 A * | 5/2000 | Rosenberg | ................ | 341/20 |
| 6,088,019 A * | 7/2000 | Rosenberg | ................ | 345/156 |
| 6,100,874 A * | 8/2000 | Schena et al. | ................ | 345/157 |
| 6,166,723 A * | 12/2000 | Schena et al. | ................ | 345/184 |
| 6,211,861 B1 * | 4/2001 | Rosenberg et al. | ................ | 345/163 |
| 6,252,579 B1 * | 6/2001 | Rosenberg et al. | ................ | 715/856 |
| 6,300,936 B1 * | 10/2001 | Braun et al. | ................ | 345/156 |
| 6,337,678 B1 * | 1/2002 | Fish | ................ | 345/156 |
| 6,429,846 B2 * | 8/2002 | Rosenberg et al. | ................ | 345/156 |
| 6,448,977 B1 * | 9/2002 | Braun et al. | ................ | 715/701 |
| 6,717,573 B1 * | 4/2004 | Shahoian et al. | ................ | 345/161 |
| 6,819,312 B2 * | 11/2004 | Fish | ................ | 345/156 |
| 7,024,625 B2 * | 4/2006 | Shalit | ................ | 715/702 |
| 7,084,854 B1 * | 8/2006 | Moore et al. | ................ | 345/157 |
| 7,088,342 B2 * | 8/2006 | Rekimoto et al. | ................ | 345/169 |
| 7,113,177 B2 * | 9/2006 | Franzen | ................ | 345/173 |

(Continued)

*Primary Examiner* — Stephen Sherman
(74) *Attorney, Agent, or Firm* — Thomas A. Hassing

(57) ABSTRACT

A system that produces a dynamic haptic effect and generates a drive signal that includes a gesture signal and a real or virtual device sensor signal. The haptic effect is modified dynamically based on both the gesture signal and the real or virtual device sensor signal such as from an accelerometer or gyroscope, or by a signal created from processing data such as still images, video or sound. The haptic effect may optionally be modified dynamically by using the gesture signal and the real or virtual device sensor signal and a physical model, or may optionally be applied concurrently to multiple devices which are connected via a communication link. The haptic effect may optionally be encoded into a data file on a first device. The data file is then communicated to a second device and the haptic effect is read from the data file and applied to the second device.

30 Claims, 15 Drawing Sheets

(56) References Cited

U.S. PATENT DOCUMENTS

| | | | |
|---|---|---|---|
| 7,205,978 B2* | 4/2007 | Poupyrev et al. | 345/157 |
| 7,336,260 B2* | 2/2008 | Martin et al. | 345/169 |
| 7,446,456 B2* | 11/2008 | Maruyama et al. | 310/328 |
| 7,456,823 B2* | 11/2008 | Poupyrev et al. | 345/173 |
| 7,468,573 B2* | 12/2008 | Dai et al. | 310/317 |
| 7,528,508 B2* | 5/2009 | Bruwer | 307/140 |
| 7,554,246 B2* | 6/2009 | Maruyama et al. | 310/338 |
| 7,592,999 B2* | 9/2009 | Rosenberg et al. | 345/156 |
| 7,663,604 B2* | 2/2010 | Maruyama et al. | 345/173 |
| 7,755,607 B2* | 7/2010 | Poupyrev et al. | 345/156 |
| 7,808,488 B2* | 10/2010 | Martin et al. | 345/169 |
| 7,821,498 B2* | 10/2010 | Kramer et al. | 345/163 |
| 7,825,903 B2* | 11/2010 | Anastas et al. | 345/173 |
| RE42,064 E * | 1/2011 | Fish | 345/156 |
| 7,890,863 B2* | 2/2011 | Grant et al. | 715/702 |
| 7,920,131 B2* | 4/2011 | Westerman | 345/173 |
| 7,924,144 B2* | 4/2011 | Makinen et al. | 340/407.2 |
| 7,969,288 B2* | 6/2011 | Braun et al. | 340/407.1 |
| 7,973,769 B2* | 7/2011 | Olien | 345/168 |
| 7,978,181 B2* | 7/2011 | Westerman | 345/173 |
| 7,982,588 B2* | 7/2011 | Makinen et al. | 340/407.2 |
| 7,982,720 B2* | 7/2011 | Rosenberg et al. | 345/173 |
| 8,004,492 B2* | 8/2011 | Kramer et al. | 345/156 |
| 8,031,181 B2* | 10/2011 | Rosenberg et al. | 345/173 |
| 8,035,623 B2* | 10/2011 | Bruwer | 345/173 |
| 8,059,105 B2* | 11/2011 | Rosenberg et al. | 345/173 |
| 8,098,235 B2* | 1/2012 | Heubel et al. | 345/173 |
| 2001/0035854 A1* | 11/2001 | Rosenberg et al. | 345/156 |
| 2002/0044132 A1* | 4/2002 | Fish | 345/156 |
| 2002/0177471 A1* | 11/2002 | Kaaresoja et al. | 455/567 |
| 2003/0063128 A1* | 4/2003 | Salmimaa et al. | 345/810 |
| 2003/0100969 A1* | 5/2003 | Jones | 700/97 |
| 2003/0162595 A1* | 8/2003 | Serbanescu | 472/1 |
| 2003/0206202 A1* | 11/2003 | Moriya | 345/846 |
| 2004/0002902 A1* | 1/2004 | Muehlhaeuser | 705/26 |
| 2005/0057528 A1* | 3/2005 | Kleen | 345/173 |
| 2005/0179617 A1* | 8/2005 | Matsui et al. | 345/7 |
| 2005/0212760 A1* | 9/2005 | Marvit et al. | 345/156 |
| 2005/0245302 A1* | 11/2005 | Bathiche et al. | 463/1 |
| 2006/0022952 A1* | 2/2006 | Ryynanen | 345/173 |
| 2006/0026536 A1* | 2/2006 | Hotelling et al. | 715/863 |
| 2006/0061545 A1* | 3/2006 | Hughes et al. | 345/156 |
| 2006/0097991 A1* | 5/2006 | Hotelling et al. | 345/173 |
| 2006/0119586 A1* | 6/2006 | Grant et al. | 345/173 |
| 2006/0181510 A1* | 8/2006 | Faith | 345/158 |
| 2006/0192760 A1* | 8/2006 | Moore et al. | 345/163 |
| 2006/0197752 A1* | 9/2006 | Hurst et al. | 345/173 |
| 2006/0255683 A1* | 11/2006 | Suzuki et al. | 310/317 |
| 2006/0256074 A1* | 11/2006 | Krum et al. | 345/156 |
| 2006/0279476 A1* | 12/2006 | Obata | 345/2.3 |
| 2006/0279542 A1* | 12/2006 | Flack et al. | 345/158 |
| 2006/0284849 A1* | 12/2006 | Grant et al. | 345/173 |
| 2007/0066283 A1* | 3/2007 | Haar et al. | 455/412.2 |
| 2007/0139366 A1* | 6/2007 | Dunko et al. | 345/156 |
| 2007/0150826 A1* | 6/2007 | Anzures et al. | 715/772 |
| 2007/0152984 A1* | 7/2007 | Ording et al. | 345/173 |
| 2007/0236450 A1* | 10/2007 | Colgate et al. | 345/156 |
| 2007/0247429 A1* | 10/2007 | Westerman | 345/168 |
| 2007/0247442 A1* | 10/2007 | Andre et al. | 345/173 |
| 2007/0265096 A1* | 11/2007 | Kouno et al. | 463/42 |
| 2007/0279392 A1* | 12/2007 | Rosenberg et al. | 345/173 |
| 2008/0024459 A1* | 1/2008 | Poupyrev et al. | 345/173 |
| 2008/0055277 A1* | 3/2008 | Takenaka et al. | 345/177 |
| 2008/0060856 A1* | 3/2008 | Shahoian et al. | 178/18.03 |
| 2008/0068334 A1* | 3/2008 | Olien et al. | 345/156 |
| 2008/0088580 A1* | 4/2008 | Poupyrev et al. | 345/156 |
| 2008/0111788 A1* | 5/2008 | Rosenberg et al. | 345/156 |
| 2008/0180406 A1* | 7/2008 | Han et al. | 345/173 |
| 2008/0216001 A1* | 9/2008 | Ording et al. | 715/763 |
| 2008/0287147 A1* | 11/2008 | Grant et al. | 455/466 |
| 2008/0300055 A1* | 12/2008 | Lutnick et al. | 463/39 |
| 2008/0303782 A1* | 12/2008 | Grant et al. | 345/156 |
| 2009/0002328 A1* | 1/2009 | Ullrich et al. | 345/173 |
| 2009/0079550 A1* | 3/2009 | Makinen et al. | 340/407.2 |
| 2009/0085878 A1* | 4/2009 | Heubel et al. | 345/173 |
| 2009/0109007 A1* | 4/2009 | Makinen et al. | 340/407.2 |
| 2009/0128503 A1* | 5/2009 | Grant et al. | 345/173 |
| 2009/0137269 A1* | 5/2009 | Chung | 455/556.1 |
| 2009/0166098 A1* | 7/2009 | Sunder | 178/18.04 |
| 2009/0167508 A1* | 7/2009 | Fadell et al. | 340/407.2 |
| 2009/0167509 A1* | 7/2009 | Fadell et al. | 340/407.2 |
| 2009/0167704 A1* | 7/2009 | Terlizzi et al. | 345/173 |
| 2009/0250267 A1* | 10/2009 | Heubel et al. | 178/18.03 |
| 2009/0256817 A1* | 10/2009 | Perlin et al. | 345/174 |
| 2009/0270046 A1* | 10/2009 | Lai | 455/73 |
| 2009/0284485 A1* | 11/2009 | Colgate et al. | 345/173 |
| 2009/0315830 A1* | 12/2009 | Westerman | 345/168 |
| 2010/0013653 A1* | 1/2010 | Birnbaum et al. | 340/669 |
| 2010/0013761 A1* | 1/2010 | Birnbaum et al. | 345/156 |
| 2010/0017489 A1* | 1/2010 | Birnbaum et al. | 709/206 |
| 2010/0017759 A1* | 1/2010 | Birnbaum et al. | 715/863 |
| 2010/0045619 A1* | 2/2010 | Birnbaum et al. | 345/173 |
| 2010/0085169 A1* | 4/2010 | Poupyrev et al. | 340/407.2 |
| 2010/0108408 A1* | 5/2010 | Colgate et al. | 178/18.03 |
| 2010/0127819 A1* | 5/2010 | Radivojevic et al. | 340/3.1 |
| 2010/0149134 A1* | 6/2010 | Westerman et al. | 345/179 |
| 2010/0156818 A1* | 6/2010 | Burrough et al. | 345/173 |
| 2010/0214243 A1* | 8/2010 | Birnbaum et al. | 345/173 |
| 2010/0231539 A1* | 9/2010 | Cruz-Hernandez et al. | 345/173 |
| 2010/0245254 A1* | 9/2010 | Olien et al. | 345/173 |
| 2010/0265208 A1* | 10/2010 | Kim et al. | 345/174 |
| 2010/0313124 A1* | 12/2010 | Privault et al. | 715/702 |
| 2010/0328053 A1* | 12/2010 | Yeh et al. | 340/407.2 |
| 2011/0021272 A1* | 1/2011 | Grant et al. | 463/30 |
| 2011/0025609 A1* | 2/2011 | Modarres et al. | 345/173 |
| 2011/0043454 A1* | 2/2011 | Modarres et al. | 345/173 |
| 2011/0043527 A1* | 2/2011 | Ording et al. | 345/428 |
| 2011/0102340 A1* | 5/2011 | Martin et al. | 345/173 |
| 2011/0105103 A1* | 5/2011 | Ullrich | 455/420 |
| 2011/0109588 A1* | 5/2011 | Makinen et al. | 345/174 |
| 2011/0138277 A1* | 6/2011 | Grant et al. | 715/702 |
| 2011/0260988 A1* | 10/2011 | Colgate et al. | 345/173 |
| 2011/0264491 A1* | 10/2011 | Birnbaum et al. | 705/14.4 |
| 2012/0068957 A1* | 3/2012 | Puskarich et al. | 345/174 |
| 2012/0081276 A1* | 4/2012 | Ullrich et al. | 345/156 |
| 2012/0105333 A1* | 5/2012 | Maschmeyer et al. | 345/173 |

* cited by examiner

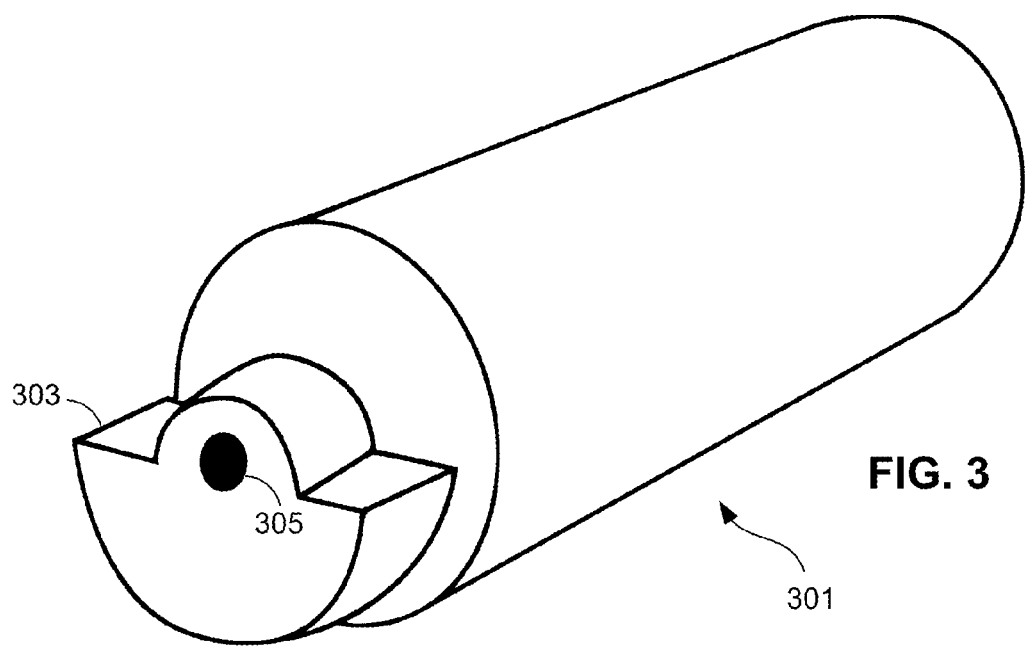
FIG. 3
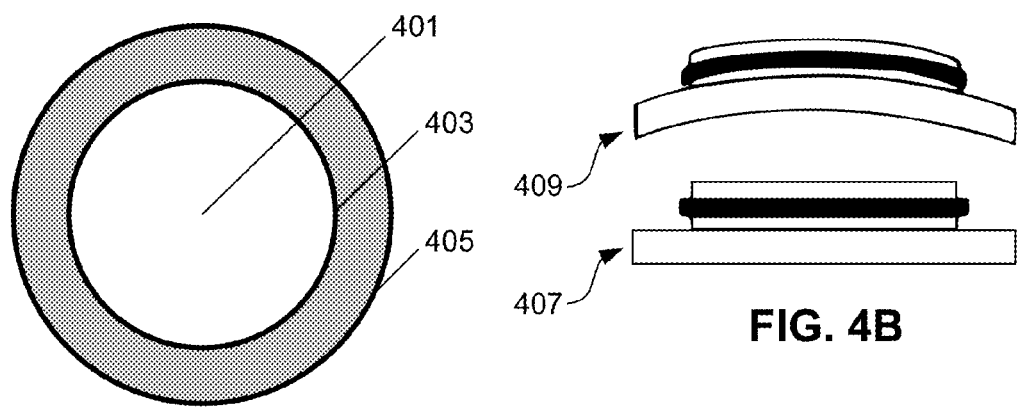
FIG. 4A
FIG. 4B
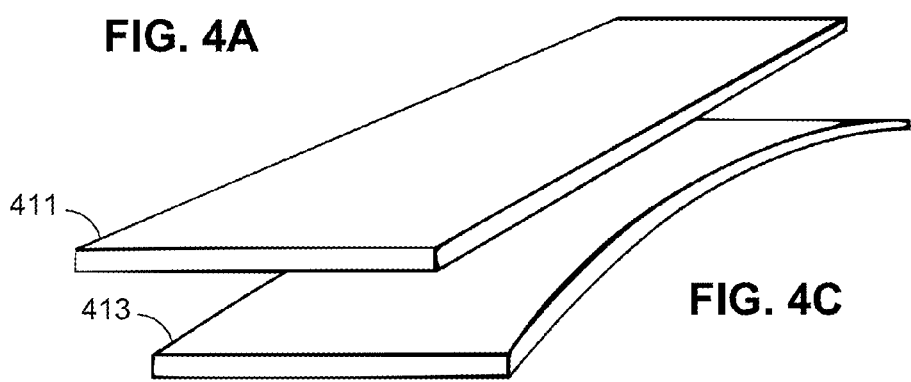
FIG. 4C

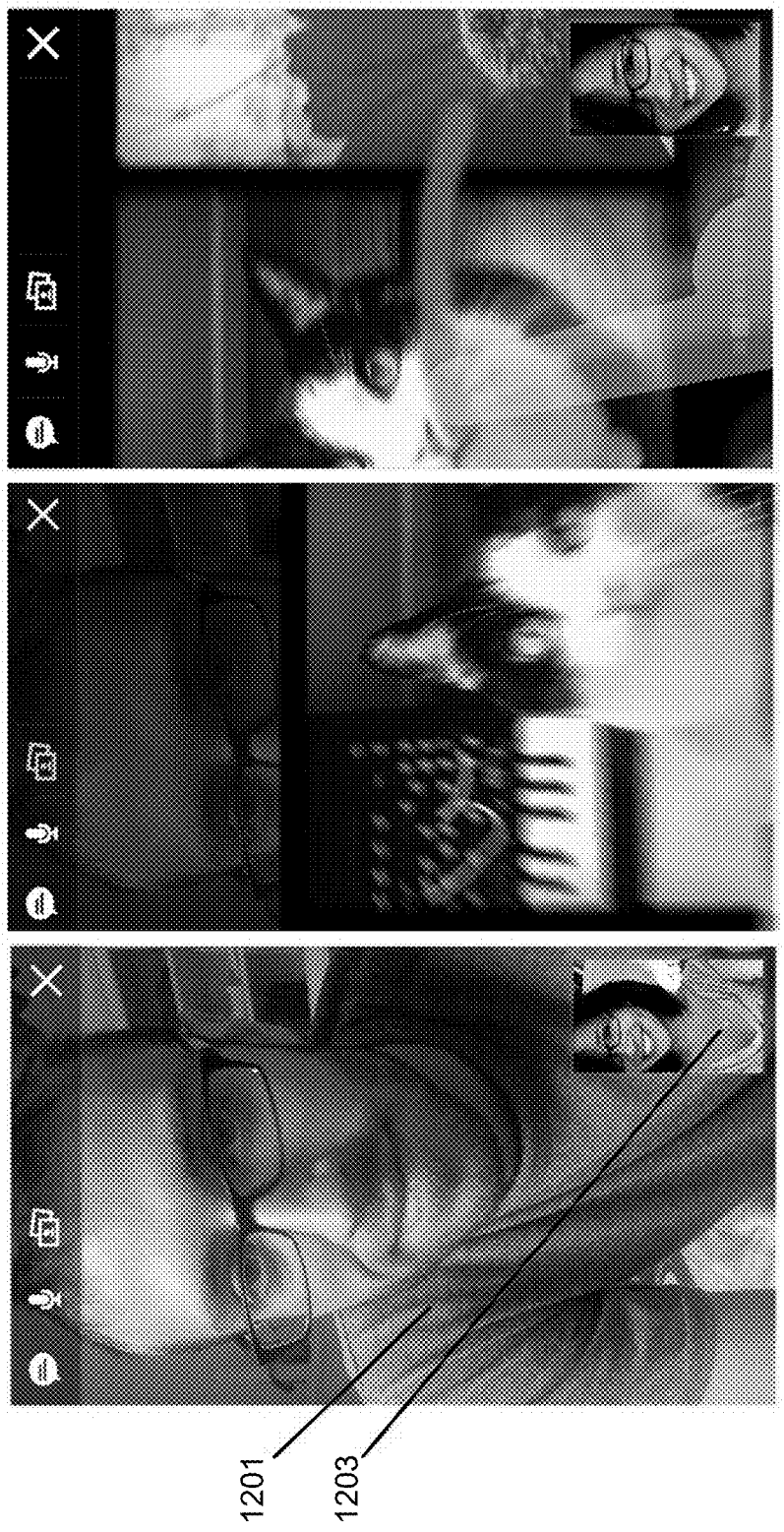

INTERACTIVITY MODEL FOR SHARED FEEDBACK ON MOBILE DEVICES

CROSS-REFERENCE TO RELATED APPLICATIONS

This application claims the benefit of priority under 35 USC §120 to copending application Ser. No. 13/592,685, filed Aug. 23, 2012, which claims the benefit of priority to application Ser. No. 13/472,709, filed May 16, 2012, which claims the benefit of priority to application Ser. No. 13/397,142, filed Feb. 15, 2012.

FIELD OF THE INVENTION

One embodiment is directed generally to a user interface for a device, and in particular to producing a dynamic haptic effect using multiple gesture signals and real or virtual device sensor signals.

BACKGROUND INFORMATION

Electronic device manufacturers strive to produce a rich interface for users. Conventional devices use visual and auditory cues to provide feedback to a user. In some interface devices, kinesthetic feedback (such as active and resistive force feedback) and/or tactile feedback (such as vibration, texture, and heat) is also provided to the user, more generally known collectively as "haptic feedback" or "haptic effects". Haptic feedback can provide cues that enhance and simplify the user interface. Specifically, vibration effects, or vibrotactile haptic effects, may be useful in providing cues to users of electronic devices to alert the user to specific events, or provide realistic feedback to create greater sensory immersion within a simulated or virtual environment.

In order to generate vibration effects, many devices utilize some type of actuator or haptic output device. Known haptic output devices used for this purpose include an electromagnetic actuator such as an Eccentric Rotating Mass ("ERM") in which an eccentric mass is moved by a motor, a Linear Resonant Actuator ("LRA") in which a mass attached to a spring is driven back and forth, or a "smart material" such as piezoelectric, electro-active polymers or shape memory alloys. Haptic output devices also broadly include non-mechanical or non-vibratory devices such as those that use electrostatic friction (ESF), ultrasonic surface friction (USF), or those that induce acoustic radiation pressure with an ultrasonic haptic transducer, or those that use a haptic substrate and a flexible or deformable surface, or those that provide projected haptic output such as a puff of air using an air jet, and so on.

Traditional architectures that provide haptic feedback only with triggered effects are available, and must be carefully designed to make sure the timing of the haptic feedback is correlated to user initiated gestures or system animations. However, because these user gestures and system animations have variable timing, the correlation to haptic feedback may be static and inconsistent and therefore less compelling to the user. Further, device sensor information is typically not used in combination with gestures to produce haptic feedback.

Therefore, there is a need for an improved system of providing a dynamic haptic effect that includes multiple gesture signals and device sensor signals. There is a further need for providing concurrent haptic feedback to multiple devices which are connected via a communication link.

SUMMARY OF THE INVENTION

One embodiment is a system that produces a dynamic haptic effect and generates a drive signal that includes a gesture signal and a real or virtual device sensor signal. The haptic effect is modified dynamically based on both the gesture signal and the real or virtual device sensor signal such as from an accelerometer or gyroscope, or by a signal created from processing data such as still images, video or sound. The haptic effect may optionally be modified dynamically by using the gesture signal and the real or virtual device sensor signal and a physical model. The haptic effect may optionally be applied concurrently to multiple devices which are connected via a communication link. The haptic effect may optionally be encoded into a data file on a first device. The data file is then communicated to a second device and the haptic effect is read from the data file and applied to the second device.

BRIEF DESCRIPTION OF THE DRAWINGS

FIG. 3 is a cut-away perspective view of an ERM implementation of a haptic actuator according to one embodiment of the present invention.

FIGS. 4A, 4B and 4C are views of a piezoelectric implementation of a haptic actuator according to one embodiment of the present invention.

FIGS. 12A, 12B, 12C, 12D and 12E are screen views of applying a haptic effect concurrently to multiple devices according to one embodiment of the present invention.

DETAILED DESCRIPTION

Figure 1:
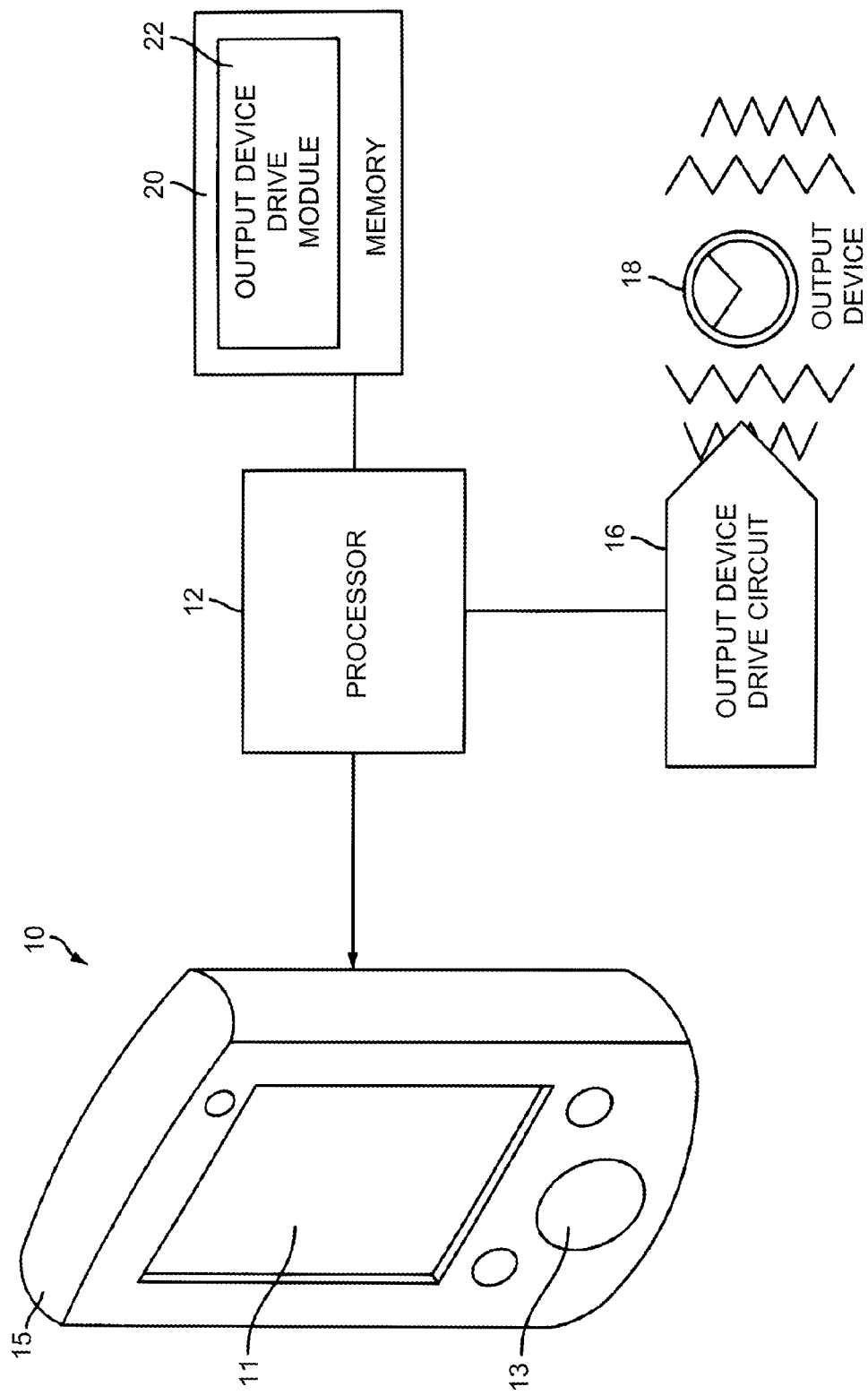
FIG. 1 is a block diagram of a haptically-enabled system according to one embodiment of the present invention.

As described below, a dynamic haptic effect refers to a haptic effect that evolves over time as it responds to one or more input parameters. Dynamic haptic effects are haptic or vibrotactile effects displayed on haptic devices to represent a change in state of a given input signal. The input signal can be a signal captured by sensors on the device with haptic feedback, such as position, acceleration, pressure, orientation, or proximity, or signals captured by other devices and sent to the haptic device to influence the generation of the haptic effect.

A dynamic effect signal can be any type of signal, but does not necessarily have to be complex. For example, a dynamic effect signal may be a simple sine wave that has some property such as phase, frequency, or amplitude that is changing over time or reacting in real time according to a mapping schema which maps an input parameter onto a changing property of the effect signal. An input parameter may be any type of input capable of being provided by a device, and typically may be any type of signal such as a device sensor signal. A device sensor signal may be generated by any means, and typically may be generated by capturing a user gesture with a device. Dynamic effects may be very useful for gesture interfaces, but the use of gestures or sensors are not necessarily required to create a dynamic signal.

One common scenario that does not involve gestures directly is defining the dynamic haptic behavior of an animated widget. For example, when a user scrolls a list, it is not typically the haptification of the gesture that will feel most intuitive, but instead the motion of the widget in response to the gesture. In the scroll list example, gently sliding the list may generate a dynamic haptic feedback that changes according to the speed of the scrolling, but flinging the scroll bar may produce dynamic haptics even after the gesture has ended. This creates the illusion that the widget has some physical properties and it provides the user with information about the state of the widget such as its velocity or whether it is in motion.

A gesture is any movement of the body that conveys meaning or user intent. It will be recognized that simple gestures may be combined to form more complex gestures. For example, bringing a finger into contact with a touch sensitive surface may be referred to as a "finger on" gesture, while removing a finger from a touch sensitive surface may be referred to as a separate "finger off" gesture. If the time between the "finger on" and "finger off" gestures is relatively short, the combined gesture may be referred to as "tapping"; if the time between the "finger on" and "finger off" gestures is relatively long, the combined gesture may be referred to as "long tapping"; if the distance between the two dimensional (x,y) positions of the "finger on" and "finger off" gestures is relatively large, the combined gesture may be referred to as "swiping"; if the distance between the two dimensional (x,y) positions of the "finger on" and "finger off" gestures is relatively small, the combined gesture may be referred to as "smearing", "smudging" or "flicking". Any number of two dimensional or three dimensional simple or complex gestures may be combined in any manner to form any number of other gestures, including, but not limited to, multiple finger contacts, palm or first contact, or proximity to the device. A gesture can also be any form of hand movement recognized by a device having an accelerometer, gyroscope, or other motion sensor, and converted to electronic signals. Such electronic signals can activate a dynamic effect, such as shaking virtual dice, where the sensor captures the user intent that generates a dynamic effect.

FIG. 1 is a block diagram of a haptically-enabled system 10 according to one embodiment of the present invention. System 10 includes a touch sensitive surface 11 or other type of user interface mounted within a housing 15, and may include mechanical keys/buttons 13. Internal to system 10 is a haptic feedback system that generates vibrations on system 10. In one embodiment, the vibrations are generated on touch surface 11.

The haptic feedback system includes a processor 12. Coupled to processor 12 is a memory 20 and an actuator drive circuit 16, which is coupled to a haptic actuator 18. Processor 12 may be any type of general purpose processor, or could be a processor specifically designed to provide haptic effects, such as an application-specific integrated circuit ("ASIC"). Processor 12 may be the same processor that operates the entire system 10, or may be a separate processor. Processor 12 can decide what haptic effects are to be played and the order in which the effects are played based on high level parameters. In general, the high level parameters that define a particular haptic effect include magnitude, frequency and duration. Low level parameters such as streaming motor commands could also be used to determine a particular haptic effect. A haptic effect may be considered dynamic if it includes some variation of these parameters when the haptic effect is generated or a variation of these parameters based on a user's interaction.

Processor 12 outputs the control signals to drive circuit 16 which includes electronic components and circuitry used to supply actuator 18 with the required electrical current and voltage to cause the desired haptic effects. System 10 may include more than one actuator 18, and each actuator may include a separate drive circuit 16, all coupled to a common processor 12. Memory device 20 can be any type of storage device or computer-readable medium, such as random access memory (RAM) or read-only memory (ROM). Memory 20 stores instructions executed by processor 12. Among the instructions, memory 20 includes an actuator drive module 22 which are instructions that, when executed by processor 12, generate drive signals for actuator 18 while also determining feedback from actuator 18 and adjusting the drive signals accordingly. The functionality of module 22 is discussed in more detail below. Memory 20 may also be located internal to processor 12, or any combination of internal and external memory.

Touch surface 11 recognizes touches, and may also recognize the position and magnitude or pressure of touches on the surface. The data corresponding to the touches is sent to processor 12, or another processor within system 10, and processor 12 interprets the touches and in response generates haptic effect signals. Touch surface 11 may sense touches using any sensing technology, including capacitive sensing, resistive sensing, surface acoustic wave sensing, pressure sensing, optical sensing, etc. Touch surface 11 may sense multi-touch contacts and may be capable of distinguishing multiple touches that occur at the same time. Touch surface 11 may be a touchscreen that generates and displays images for the user to interact with, such as keys, dials, etc., or may be a touchpad with minimal or no images.

System 10 may be a handheld device, such as a cellular telephone, PDA, computer tablet, gaming console, etc. or may be any other type of device that provides a user interface and includes a haptic effect system that includes one or more ERMs, LRAs, electrostatic or other types of actuators. The user interface may be a touch sensitive surface, or can be any other type of user interface such as a mouse, touchpad, mini-joystick, scroll wheel, trackball, game pads or game controllers, etc. In embodiments with more than one actuator, each actuator may have a different output capability in order to create a wide range of haptic effects on the device. Each actuator may be any type of haptic actuator or a single or multidimensional array of actuators.

Figure 2:
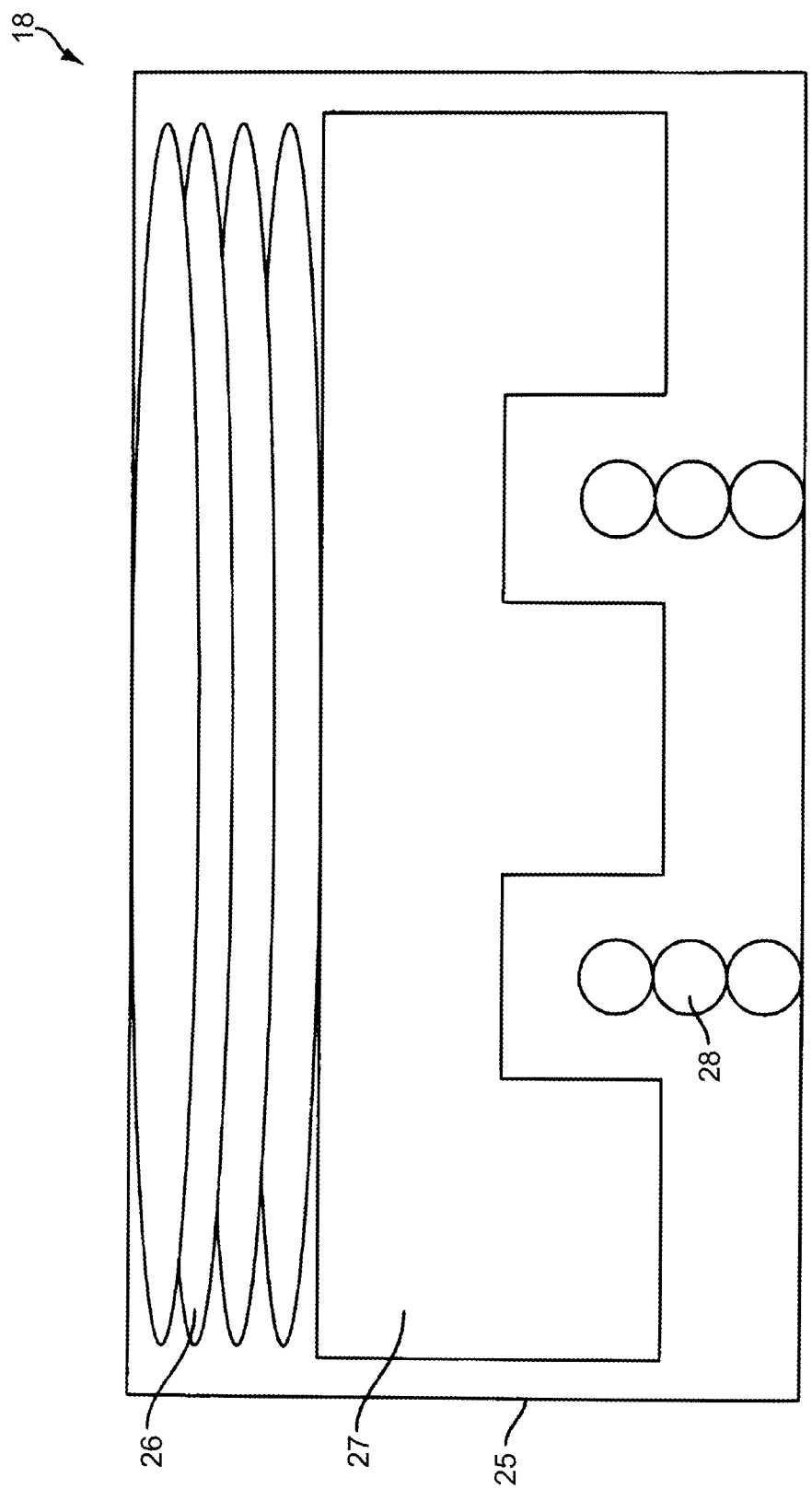
FIG. 2 is a cut-away perspective view of an LRA implementation of a haptic actuator according to one embodiment of the present invention.

FIG. 2 is a cut-away side view of an LRA implementation of actuator 18 in accordance to one embodiment. LRA 18 includes a casing 25, a magnet/mass 27, a linear spring 26, and an electric coil 28. Magnet 27 is mounted to casing 25 by spring 26. Coil 28 is mounted directly on the bottom of casing 25 underneath magnet 27. LRA 18 is typical of any known LRA. In operation, when current flows through coil 28 a magnetic field forms around coil 28 which in interaction with the magnetic field of magnet 27 pushes or pulls on magnet 27. One current flow direction/polarity causes a push action and the other a pull action. Spring 26 controls the up and down movement of magnet 27 and has a deflected up position where it is compressed, a deflected down position where it is expanded, and a neutral or zero-crossing position where it is neither compressed or deflected and which is equal to its resting state when no current is being applied to coil 28 and there is no movement/oscillation of magnet 27.

For LRA 18, a mechanical quality factor or "Q factor" can be measured. In general, the mechanical Q factor is a dimensionless parameter that compares a time constant for decay of an oscillating physical system's amplitude to its oscillation period. The mechanical Q factor is significantly affected by mounting variations. The mechanical Q factor represents the ratio of the energy circulated between the mass and spring over the energy lost at every oscillation cycle. A low Q factor means that a large portion of the energy stored in the mass and spring is lost at every cycle. In general, a minimum Q factor occurs with system 10 is held firmly in a hand due to energy being absorbed by the tissues of the hand. The maximum Q factor generally occurs when system 10 is pressed against a hard and heavy surface that reflects all of the vibration energy back into LRA 18.

In direct proportionality to the mechanical Q factor, the forces that occur between magnet/mass 27 and spring 26 at resonance are typically 10-100 times larger than the force that coil 28 must produce to maintain the oscillation. Consequently, the resonant frequency of LRA 18 is mostly defined by the mass of magnet 27 and the compliance of spring 26. However, when an LRA is mounted to a floating device (i.e., system 10 held softly in a hand), the LRA resonant frequency shifts up significantly. Further, significant frequency shifts can occur due to external factors affecting the apparent mounting weight of LRA 18 in system 10, such as a cell phone flipped open/closed or the phone held tightly.

FIG. 3 is a cut-away perspective view of an ERM implementation of actuator 18 according to one embodiment of the present invention. ERM 18 includes a rotating mass 301 having an off-center weight 303 that rotates about an axis of rotation 305. In operation, any type of motor may be coupled to ERM 18 to cause rotation in one or both directions around the axis of rotation 305 in response to the amount and polarity of voltage applied to the motor. It will be recognized that an application of voltage in the same direction of rotation will have an acceleration effect and cause the ERM 18 to increase its rotational speed, and that an application of voltage in the opposite direction of rotation will have a braking effect and cause the ERM 18 to decrease or even reverse its rotational speed.

One embodiment of the present invention provides haptic feedback by determining and modifying the angular speed of ERM 18. Angular speed is a scalar measure of rotation rate, and represents the magnitude of the vector quantity angular velocity. Angular speed or frequency w, in radians per second, correlates to frequency v in cycles per second, also called Hz, by a factor of $2\pi$. The drive signal includes a drive period where at least one drive pulse is applied to ERM 18, and a monitoring period where the back electromagnetic field ("EMF") of the rotating mass 301 is received and used to determine the angular speed of ERM 18. In another embodiment, the drive period and the monitoring period are concurrent and the present invention dynamically determines the angular speed of ERM 18 during both the drive and monitoring periods.

FIGS. 4A-4C are views of a piezoelectric implementation of a haptic actuator 18 according to one embodiment of the present invention. FIG. 4A shows a disk piezoelectric actuator that includes an electrode 401, a piezo ceramics disk 403 and a metal disk 405. As shown in FIG. 4B, when a voltage is applied to electrode 401, the piezoelectric actuator bends in response, going from a relaxed state 407 to a transformed state 409. When a voltage is applied, it is that bending of the actuator that creates the foundation of vibration. Alternatively, FIG. 4C shows a beam piezoelectric actuator that operates similarly to a disk piezoelectric actuator by going from a relaxed state 411 to a transformed state 413.

Figure 5:
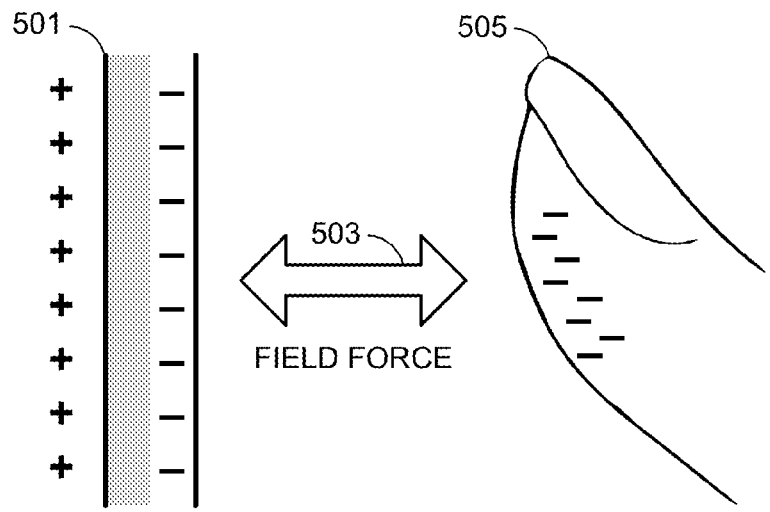
FIG. 5 is a view of a haptic device using electrostatic friction (ESF) according to one embodiment of the present invention.

FIG. 5 is a view of a haptic device using electrostatic friction (ESF) according to one embodiment of the present invention. Similar to the operational principles described by Makinen et al. in U.S. Pat. No. 7,982,588, the embodiment is based on the discovery that subcutaneous Pacinian corpuscles can be stimulated by means of a capacitive electrical coupling and an appropriately dimensioned control voltage, either without any mechanical stimulation of the Pacinian corpuscles or as an additional stimulation separate from such mechanical stimulation. An appropriately dimensioned high voltage is used as the control voltage. In the present context, a high voltage means such a voltage that direct galvanic contact must be prevented for reasons of safety and/or user comfort. This results in a capacitive coupling between the Pacinian corpuscles and the apparatus causing the stimulation, wherein one side of the capacitive coupling is formed by at least one galvanically isolated electrode connected to the stimulating apparatus, while the other side, in close proximity to the electrode, is formed by the body member, preferably a finger, of the stimulation target, such as the user of the apparatus, and more specifically the subcutaneous Pacinian corpuscles.

It likely that the invention is based on a controlled formation of an electric field between an active surface of the apparatus and the body member, such as a finger, approaching or touching it. The electric field tends to give rise to an opposite charge on the proximate finger. A local electric field and a capacitive coupling can be formed between the charges. The electric field directs a force on the charge of the finger tissue. By appropriately altering the electric field a force capable of moving the tissue may arise, whereby the sensory receptors sense such movement as vibration.

As shown in FIG. 5, one or more conducting electrodes 501 are provided with an insulator. When a body member such as finger 505 is proximate to the conducting electrode 501, the insulator prevents flow of direct current from the conducting electrode to the body member 505. A capacitive coupling field force 503 over the insulator is formed between the conducting electrode 501 and the body member 505. The apparatus also comprises a high-voltage source for applying an electrical input to the one or more conducting electrodes, wherein the electrical input comprises a low-frequency component in a frequency range between 10 Hz and 1000 Hz. The capacitive coupling and electrical input are dimensioned to produce an electrosensory sensation which is produced independently of any mechanical vibration of the one or more conducting electrodes or insulators.

Figure 6:
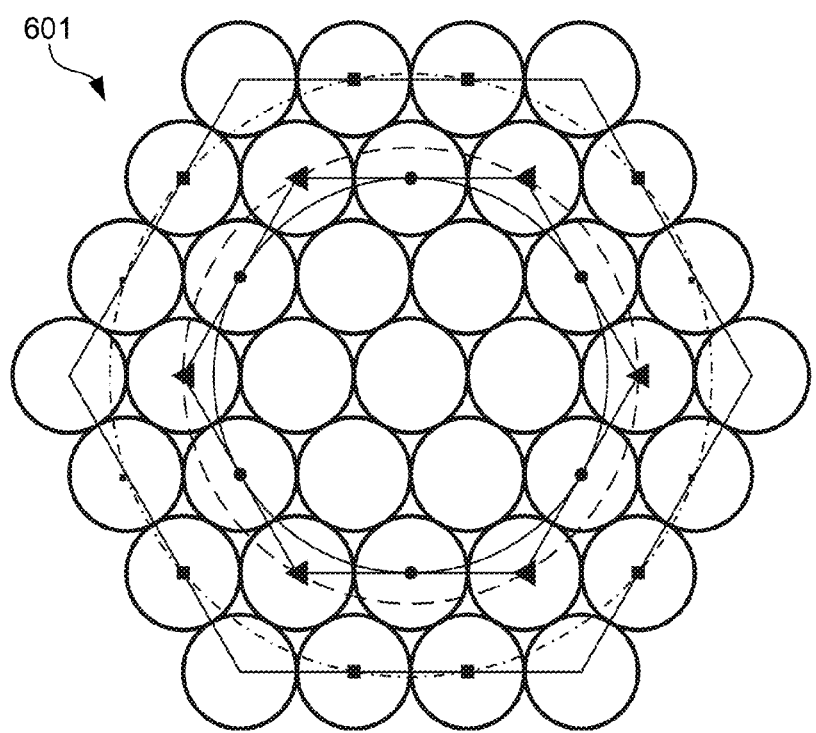
FIG. 6 is a view of a haptic device for inducing acoustic radiation pressure with an ultrasonic haptic transducer according to one embodiment of the present invention.

FIG. 6 is a view of a haptic device for inducing acoustic radiation pressure with an ultrasonic haptic transducer similar to that described by Iwamoto et al., "Non-contact Method for Producing Tactile Sensation Using Airborne Ultrasound", Eurohaptics 2008, LNCS 5024, pp. 504-513. An airborne ultrasound transducer array 601 is designed to provide tactile feedback in three-dimensional (3D) free space. The array radiates airborne ultrasound, and produces high-fidelity pressure fields onto the user's hands without the use of gloves or mechanical attachments. The method is based on a nonlinear phenomenon of ultrasound; acoustic radiation pressure. When an object interrupts the propagation of ultrasound, a pressure field is exerted on the surface of the object. This pressure is called acoustic radiation pressure. The acoustic radiation pressure P [Pa] is simply described as $P=\alpha E$, where $E$ [$J=m^3$] is the energy density of the ultrasound and $\alpha$ is a constant ranging from 1 to 2 depending on the reflection properties of the surface of the object. The equation describes how the acoustic radiation pressure is proportional to the energy density of the ultrasound. The spatial distribution of the energy density of the ultrasound can be controlled by using the wave field synthesis techniques. With an ultrasound transducer array, various patterns of pressure field are produced in 3D free space. Unlike air-jets, the spatial and temporal resolutions are quite fine. The spatial resolution is comparable to the wavelength of the ultrasound. The frequency characteristics are sufficiently fine up to 1 kHz.

The airborne ultrasound can be applied directly onto the skin without the risk of the penetration. When the airborne ultrasound is applied on the surface of the skin, due to the large difference between the characteristic acoustic impedance of the air and that of the skin, about 99.9% of the incident acoustic energy is reflected on the surface of the skin. Hence, this tactile feedback system does not require the users to wear any clumsy gloves or mechanical attachments.

Figure 7:
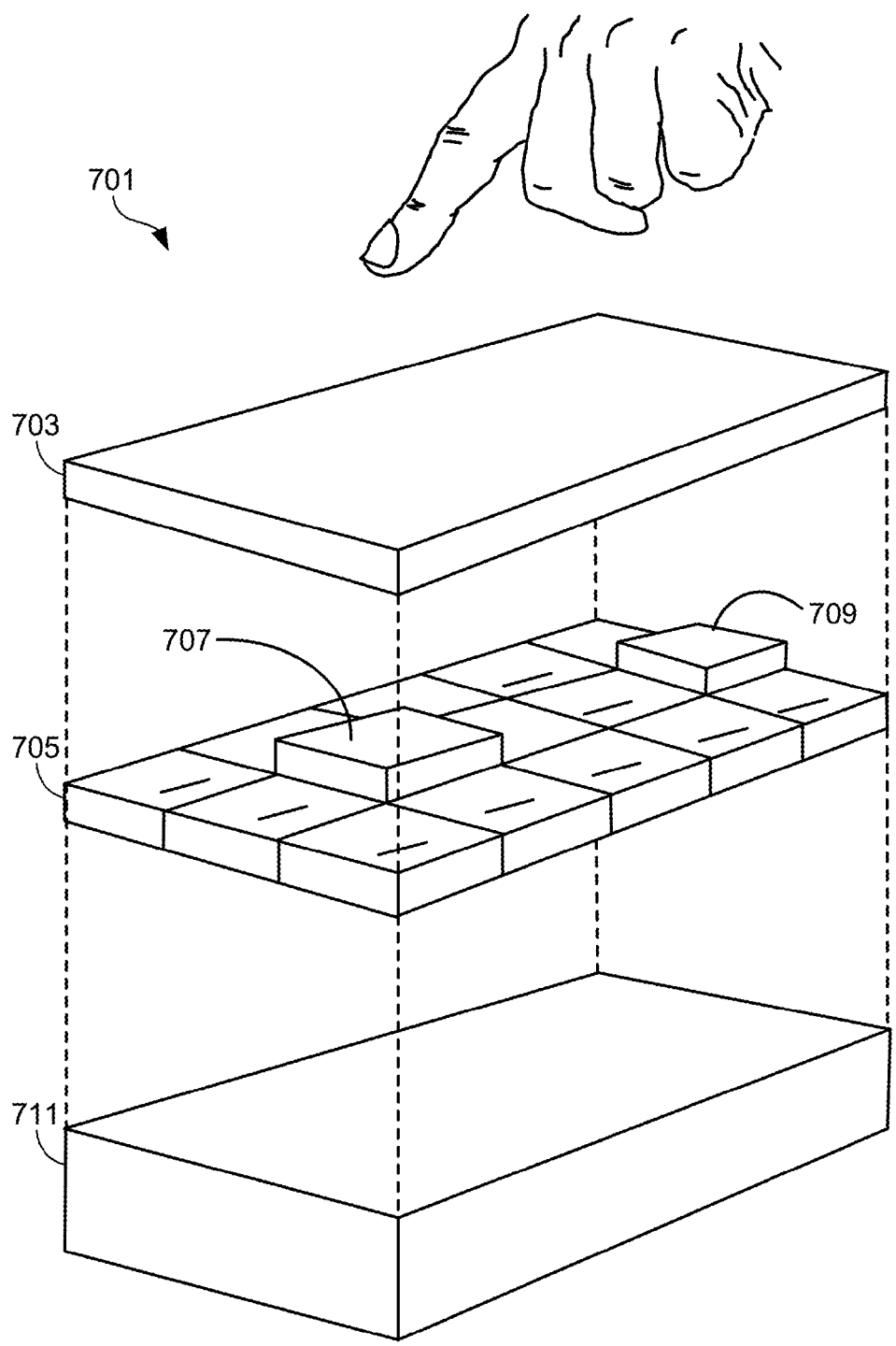
FIG. 7 is a view of a haptic device using a haptic substrate and flexible or deformable surface according to one embodiment of the present invention.

FIG. 7 shows a three-dimensional (3D) diagram illustrating a haptic device 701 using a haptic substrate and a flexible surface in accordance with one embodiment of the present invention. Device 701 includes a flexible surface layer 703, a haptic substrate 705, and a deforming mechanism 711. It should be noted that device 701 can be a user interface device, such as an interface for a cellular phone, a personal digital assistant ("PDA"), an automotive data input system, and so forth. It should be further noted that the underlying concept of the exemplary embodiment of the present invention would not change if one or more blocks (circuits or layers) were added to or removed from device 701.

Flexible surface layer 703, in one instance, is made of soft and/or elastic materials such as silicone rubber, which is also known as polysiloxane. A function of the flexible surface layer 703 is to change its surface shape or texture upon contact with the physical pattern of haptic substrate 705. The physical pattern of haptic substrate 705 is variable as one or more of the local features 110-124 can be raised or lowered to present features to affect the surface of the flexible surface layer 703 upon contact. Once the physical pattern of haptic substrate 705 is determined, the texture of flexible surface layer 703 can change to confirm its surface texture to the physical pattern of haptic substrate 705. It should be note that the deformation of flexible surface layer 703 from one texture to another can be controlled by deforming mechanism 711. For example, when deforming mechanism 711 is not activated, flexible surface layer 703 maintains its smooth configuration floating or sitting over haptic substrate 705. The surface configuration of flexible surface layer 703, however, deforms or changes from a smooth configuration to a coarse configuration when deforming mechanism 711 is activated and the haptic substrate 705 is in contact with the flexible surface layer 703 so as to generate a similar pattern on the top surface of the flexible surface layer 703.

Alternatively, flexible surface layer 703 is a flexible touch sensitive surface, which is capable of accepting user inputs. The flexible touch sensitive surface can be divided into multiple regions wherein each region of the flexible touch sensitive surface can accept an input when the region is being touched or depressed by a finger. In one embodiment, the flexible touch sensitive surface includes a sensor, which is capable of detecting a nearby finger and waking up or turning on the device. Flexible surface layer 703 may also include a flexible display, which is capable of deforming together with flexible surface layer 703. It should be noted that various flexible display technologies can be used to manufacture flexible displays, such as organic light-emitting diode (OLED), organic, or polymer TFT (Thin Film Transistor).

Haptic substrate 705 is a surface reconfigurable haptic device capable of changing its surface pattern in response to one or more pattern activating signals. Haptic substrate 705 can also be referred to as a haptic mechanism, a haptic layer, a tactile element, and the like. Haptic substrate 705, in one embodiment, includes multiple tactile or haptic regions 707, 709, wherein each region can be independently controlled and activated. Since each tactile region can be independently activated, a unique surface pattern of haptic substrate 705 can be composed in response to the pattern activating signals. In another embodiment, every tactile region is further divided into multiple haptic bits wherein each bit can be independently excited or activated or deactivated.

Haptic substrate 705, or a haptic mechanism, in one embodiment, is operable to provide haptic feedback in response to an activating command or signal. Haptic substrate 705 provides multiple tactile or haptic feedbacks wherein one tactile feedback is used for surface deformation, while another tactile feedback is used for input confirmation. Input confirmation is a haptic feedback to inform a user about a selected input. Haptic mechanism 705, for example, can be implemented by various techniques including vibration, vertical displacement, lateral displacement, push/pull technique, air/fluid pockets, local deformation of materials, resonant mechanical elements, piezoelectric materials, micro-electromechanical systems ("MEMS") elements, thermal fluid pockets, MEMS pumps, variable porosity membranes, laminar flow modulation, or the like.

Haptic substrate 705, in one embodiment, is constructed by semi-flexible or semi-rigid materials. In one embodiment, haptic substrate should be more rigid than flexible surface 703 thereby the surface texture of flexible surface 703 can confirm to the surface pattern of haptic substrate 705. Haptic substrate 705, for example, includes one or more actuators, which can be constructed from fibers (or nanotubes) of electroactive polymers ("EAP"), piezoelectric elements, fiber of shape memory alloys ("SMAs") or the like. EAP, also known as biological muscles or artificial muscles, is capable of changing its shape in response to an application of voltage. The physical shape of an EAP may be deformed when it sustains large force. EAP may be constructed from Electrostrictive Polymers, Dielectric elastomers, Conducting Polyers, Ionic Polymer Metal Composites, Responsive Gels, Bucky gel actuators, or a combination of the above-mentioned EAP materials.

SMA (Shape Memory Alloy), also known as memory metal, is another type of material which can be used to construct haptic substrate 705. SMA may be made of copper-zinc-aluminum, copper-aluminum-nickel, nickel-titanium alloys, or a combination of copper-zinc-aluminum, copper-aluminum-nickel, and/or nickel-titanium alloys. A characteristic of SMA is that when its original shape is deformed, it regains its original shape in accordance with the ambient temperature and/or surrounding environment. It should be noted that the present embodiment may combine the EAP, piezoelectric elements, and/or SMA to achieve a specific haptic sensation.

Deforming mechanism 711 provides a pulling and/or pushing force to translate elements in the haptic substrate 705 causing flexible surface 703 to deform. For example, when deforming mechanism 711 creates a vacuum between flexible surface 703 and haptic substrate 705, flexible surface 703 is pushed against haptic substrate 705 causing flexible surface 703 to show the texture of flexible surface 703 in accordance with the surface pattern of haptic substrate 705. In other words, once a surface pattern of haptic substrate 705 is generated, flexible surface is pulled or pushed against haptic substrate 705 to reveal the pattern of haptic substrate 705 through the deformed surface of flexible surface 703. In one embodiment, haptic substrate 705 and deforming mechanism 711 are constructed in the same or substantially the same layer.

Upon receipt of a first activating signal, haptic substrate 705 generates a first surface pattern. After formation of the surface pattern of haptic substrate 705, deforming mechanism 711 is subsequently activated to change surface texture of flexible surface 703 in response to the surface pattern of haptic substrate 705. Alternatively, if haptic substrate 705 receives a second activating signal, it generates a second pattern.

Haptic substrate 705 further includes multiple tactile regions wherein each region can be independently activated to form a surface pattern of the substrate. Haptic substrate 705 is also capable of generating a confirmation feedback to confirm an input selection entered by a user. Deforming mechanism 711 is configured to deform the surface texture of flexible surface 703 from a first surface characteristic to a second surface characteristic. It should be noted that haptic device further includes a sensor, which is capable of activating the device when the sensor detects a touch on flexible surface 703. Deforming mechanism 711 may be a vacuum generator, which is capable of causing flexible surface 703 to collapse against the first surface pattern to transform its surface configuration in accordance with the configuration of first pattern of haptic substrate 705.

Haptic substrate 705 illustrates the state when tactile regions 707 and 709 are activated. Tactile regions 707 and 709 are raised in a z-axis direction. Upon receipt of one or more activating signals, haptic substrate 705 identifies a surface pattern in accordance with the activating signals. Haptic substrate 705 provides identified pattern by activating various tactile regions such as regions 707 and 709 to generate the pattern. It should be noted that tactile regions 707 and 709 imitate two buttons or keys. In another embodiment, tactile region 707 or 709 includes multiple haptic bits wherein each bit can be controlled for activating or deactivating.

Figure 8A:
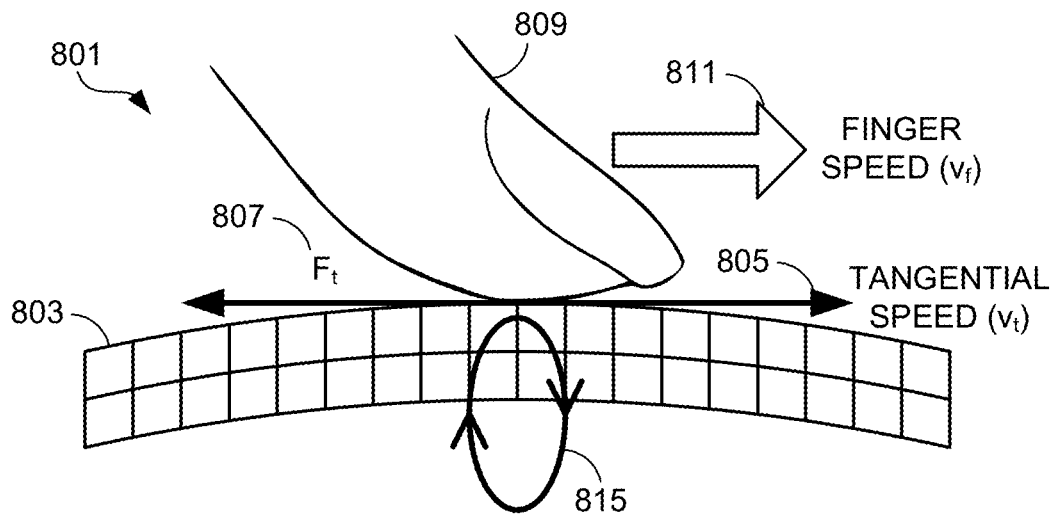
FIGS. 8A and 8B are views of a haptic device using ultrasonic surface friction (USF) according to one embodiment of the present invention.
Figure 8B:
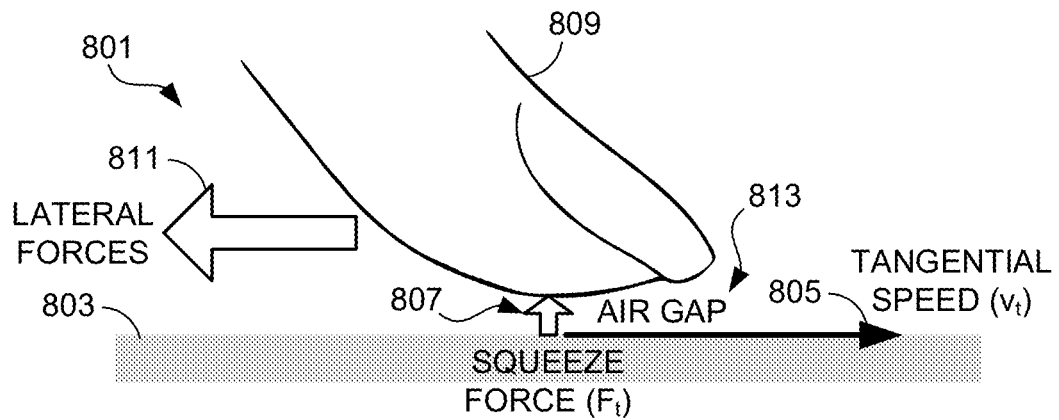

FIG. 8 is a view of a haptic device using ultrasonic surface friction (USF) similar to that described by Biet et al., "New Tactile Devices Using Piezoelectric Actuators", ACTUATOR 2006, 10$^{th}$ International Conference on New Actuators, 14-16 Jun. 2006, Bremen, Germany. An ultrasonic vibration display 801 produces ultrasonic vibrations in the order of a few micrometers. The display 801 consists of a touch interface surface 803 that vibrates at the ultrasound range. The vibrations 805 travel along the touch surface 803 at a speed $v_t$ when a finger 809 is in contact and applies a force 807 $F_t$ to the surface 803. The vibrations 805 create an apparent reduction of friction on the surface 803. One explanation is that by moving up and down, the touch surface 803 creates an air gap 813 between the surface 803 and the interacting finger 809, and is the air gap 813 that causes the reduction in friction. This can be thought as of a Lamb wave 815 along the surface 803 that at some instants in time is in contact with the finger 809 when the finger 809 is in contact with the crest or peak of the wave 805, and sometimes is not when the finger 809 is above the valley of the wave 805. When finger 809 is moved in a lateral direction 811 at a speed $v_f$, the apparent friction of the surface 803 is reduced due to the on and off contact of the surface 803 with the finger 809. When the surface 803 is not activated, the finger 809 is always in contact with the surface 803 and the static or kinetic coefficients of friction remain constant.

Because the vibrations 805 occur on surface 803 in the ultrasound range of typically 20 KHz or greater, the wavelength content is usually smaller than the finger size, thus allowing for a consistent experience. It will be noted that the normal displacement of surface 803 is in the order of less than 5 micrometers, and that a smaller displacement results in lower friction reduction.

Figure 9C:
FIGS. 9A, 9B and 9C are screen views of a user initiated dynamic haptic effect according to one embodiment of the present invention.
Figure 9B:
Figure 9A:
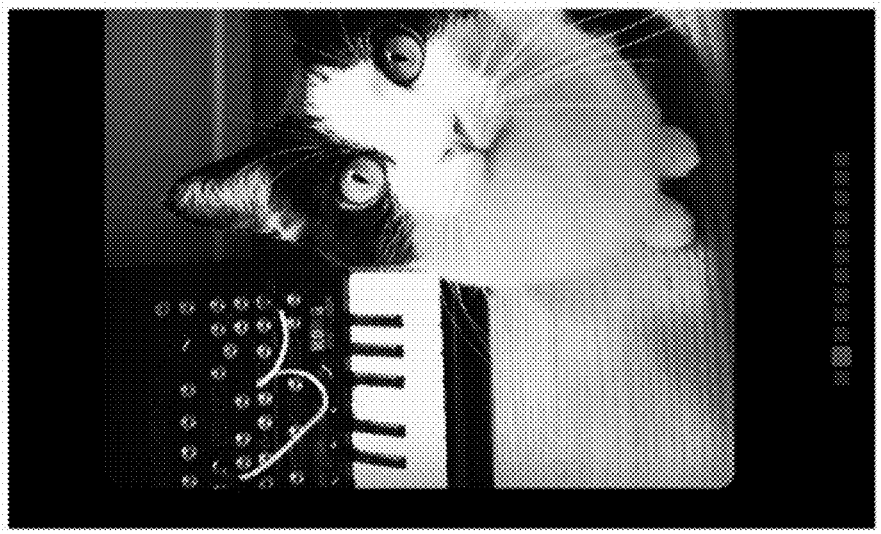

FIGS. 9A-9C are screen views of a user initiated dynamic haptic effect according to one embodiment of the present invention. Dynamic effects involve changing a haptic effect provided by a haptic enabled device in real time according to an interaction parameter. An interaction parameter can be derived from any two-dimensional or three-dimensional gesture using information such as the position, direction and velocity of a gesture from a two-dimensional on-screen display such as on a mobile phone or tablet computer, or a three-dimensional gesture detection system such as a video motion capture system or an electronic glove worn by the user, or by any other 2D or 3D gesture input means. FIG. 9A shows a screen view of a mobile device having a touch sensitive display which displays one photograph out of a group of photographs. FIG. 9B shows a screen view of a user gesture using a single index finger being swiped across the touch sensitive display from right to left in order to display the next photograph. Multiple inputs from the index finger are received from the single gesture. Each of the multiple inputs may occur at a different time and may indicate a different two dimensional position of the contact point of the index finger with the touch sensitive display.

FIG. 9C shows a screen view of the next photograph being displayed in conjunction with a dynamic haptic effect. Based upon the one or more inputs from the one or more user gestures in FIG. 9B, a dynamic haptic effect is provided during the user gesture and continuously modified as determined by the interaction parameter. The dynamic haptic effect may speed up or slow down, increase or decrease in intensity, or change its pattern or duration, or change in any other way, in real-time according to such elements as the speed, direction, pressure, magnitude, or duration of the user gesture itself, or based on a changing property of a virtual object such as the number of times an image has been viewed. The dynamic haptic effect may further continue and may further be modified by the interaction parameter even after the user gesture has stopped. For example, in one embodiment the dynamic haptic effect may be stop immediately at the end of the user gesture, or in another embodiment the dynamic haptic effect may optionally fade slowly after the end of the user gesture according to the interaction parameter. The effect of providing or modifying a dynamic haptic effect in real-time during and even after a user gesture is that no two gestures such as page turns or finger swipes will feel the same to the user. That is, the dynamic haptic effect will always be unique to the user gesture, thereby creating a greater sense connectedness to the device and a more compelling user interface experience for the user as compared to a simple static haptic effect provided by a trigger event.

The interaction parameter may also be derived from device sensor data such as whole device acceleration, gyroscopic information or ambient information. Device sensor signals may be any type of sensor input enabled by a device, such as from an accelerometer or gyroscope, or any type of ambient sensor signal such as from a microphone, photometer, thermometer or altimeter, or any type of bio monitor such as skin or body temperature, blood pressure (BP), heart rate monitor (HRM), electroencephalograph (EEG), or galvanic skin response (GSR), or information or signals received from a remotely coupled device, or any other type of signal or sensor including, but not limited to, the examples listed in TABLE 1 below.

TABLE 1

LIST OF SENSORS
For the purposes of physical interaction design, a sensor is a transducer that converts a form of energy into an electrical signal, or any signal that represents virtual sensor information.

Acceleration

Accelerometer
Biosignals

Electrocardiogram (ECG)
Electroencephalogram (EEG)
Electromyography (EMG)
Electrooculography (EOG)
Electropalatography (EPG)
Galvanic Skin Response (GSR)
Distance Capacitive
Hall Effect
Infrared
Ultrasound
Flow Ultrasound
Force/pressure/strain/bend Air Pressure
Fibre Optic Sensors
Flexion
Force-sensitive Resistor (FSR)
Load Cell
LuSense CPS$^2$ 155
Miniature Pressure Transducer
Piezoelectric Ceramic & Film
Strain Gage
Humidity Hygrometer
Linear position Hall Effect
Linear Position (Touch)
Linear Potentiometer (Slider)
Linear Variable Differential Transformer (LVDT)
LuSense CPS$^2$ 155
Orientation/inclination Accelerometer
Compass (Magnetoresistive)
Inclinometer
Radio Frequency Radio Frequency Identification (RFID)
Rotary position Rotary Encoder
Rotary Potentiometer TABLE 1-continued LIST OF SENSORS
For the purposes of physical interaction design, a sensor is a transducer that converts a form of energy into an electrical signal, or any signal that represents virtual sensor information.

Rotary velocity

Gyroscope
Switches

On-Off Switch
Temperature

Temperature
Vibration

Piezoelectric Ceramic & Film
Visible light intensity

Fibre Optic Sensors
Light-Dependent Resistor (LDR)

Active or ambient device sensor data may be used to modify the haptic feedback based any number of factors relating to a user's environment or activity. For example, an accelerometer device sensor signal may indicate that a user is engaging in physical activity such as walking or running, so the pattern and duration of the haptic feedback should be modified to be more noticeable to the user. In another example, a microphone sensor signal may indicate that a user is in a noisy environment, so the amplitude or intensity of the haptic feedback should be increased. Sensor data may also include virtual sensor data which is represented by information or signals that are created from processing data such as still images, video or sound. For example, a video game that has a virtual racing car may dynamically change a haptic effect based the car velocity, how close the car is to the camera viewing angle, the size of the car, and so on.

The interaction parameter may optionally incorporate a mathematical model related to a real-world physical effect such as gravity, acceleration, friction or inertia. For example, the motion and interaction that a user has with an object such as a virtual rolling ball may appear to follow the same laws of physics in the virtual environment as an equivalent rolling ball would follow in a non-virtual environment.

The interaction parameter may optionally incorporate an animation index to correlate the haptic output of a device to an animation or a visual or audio script. For example, an animation or script may play in response to a user or system initiated action such as opening or changing the size of a virtual window, turning a page or scrolling through a list of data entries.

Two or more gesture signals, device sensor signals or physical model inputs may be used alone or in any combination with each other to create an interaction parameter having a difference vector. A difference vector may be created from two or more scalar or vector inputs by comparing the scalar or vector inputs with each other, determining what change or difference exists between the inputs, and then generating a difference vector which incorporates a position location, direction and magnitude. Gesture signals may be used alone to create a gesture difference vector, or device sensor signals may be used alone to create a device signal difference vector.

Figure 10C:
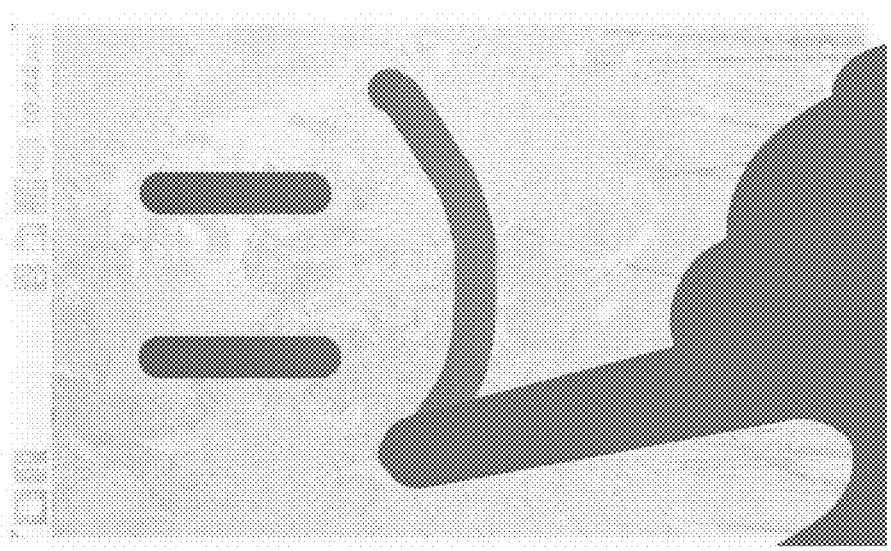
FIGS. 10A, 10B, 10C, 10D, 10E and 10F are screen views of encoding a haptic effect into a data file according to one embodiment of the present invention.
Figure 10B:
Figure 10A:
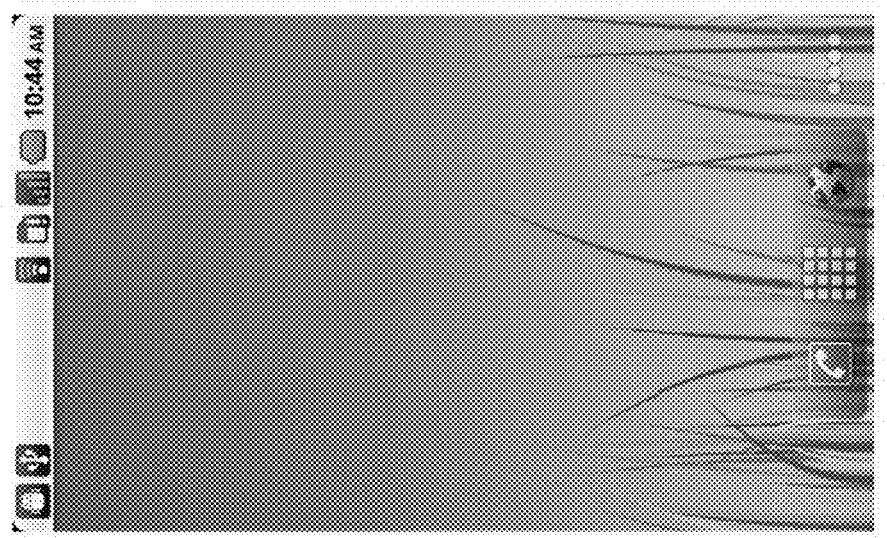

FIGS. 10A-10F are screen views of encoding a haptic effect into a data file according to one embodiment of the present invention. In order to facilitate dynamic haptic feedback between two or more users, it is not necessary to have low latency or pseudo synchronous communication of the haptic effect. Instead, one embodiment of the present invention enables remote haptic interaction that takes place out of real time by encoding haptic effect data into a shared data file. An example of such a non real time interaction is encoding the haptic effect taken from a digital drawing surface. FIG. 10A shows a default screen view of a virtual "frost" application running on a handheld or mobile device having a digital drawing surface and a haptic actuator. FIG. 10B shows the screen view of a "frosted" screen, created from the default screen view in response to user gestures or device sensor signals such as blowing into a microphone on the handheld device. Once the screen is frosted, FIG. 10C shows the creation of a stylized face pattern drawn in the frost according to gestures provided by the first user. The frosted screen and stylized face are stored in a data file in a format that supports either raster or vector depiction of images, and optionally any other data or metadata necessary for subsequent reproduction of the image such as information about stored gestures or device sensor information.

Figures 10D, 10E, 10F:

A haptic effect corresponding to the motions used to create the stylized face is stored or encoded into the data file concurrently with the other image information in the data file. The haptic effect information may be stored in any way that permits the reproduction of the haptic effect along with the image. The data file is then communicated to a second device having a haptic actuator via any file transfer mechanism or communication link. FIG. 10D shows the second device reading the stored gesture or device sensor signal from the data file on the second device and displaying the default frosted screen view. FIG. 10E shows how the stylized face is then subsequently displayed on the second device. A drive signal is also applied to the haptic actuator on the second device according to the gesture or device sensor signal stored in the file.

The second user may optionally collaborate with the first user to create a combined data file by providing additional gestures or device sensor signals to add the virtual message "Hi" on the drawing, along with any corresponding haptic effect generated from the virtual message and stored in the data file. FIG. 10F shows the final collaborative screen view which combines gestures and device sensor signals from the first and second users along with the corresponding haptic effect data. Gestures, device sensor signals and haptic effect data generated by both users are stored or encoded into the data file as a combined collaborative document which can subsequently be communicated between the users or to other users for further input, modification or collaboration. Although the above example describes a digital drawing surface, it will be recognized that many other types of user gestures and device sensor data may be stored or encoded with haptic effect signals in any type of data file in virtually any format, without limitation.

Figure 11:
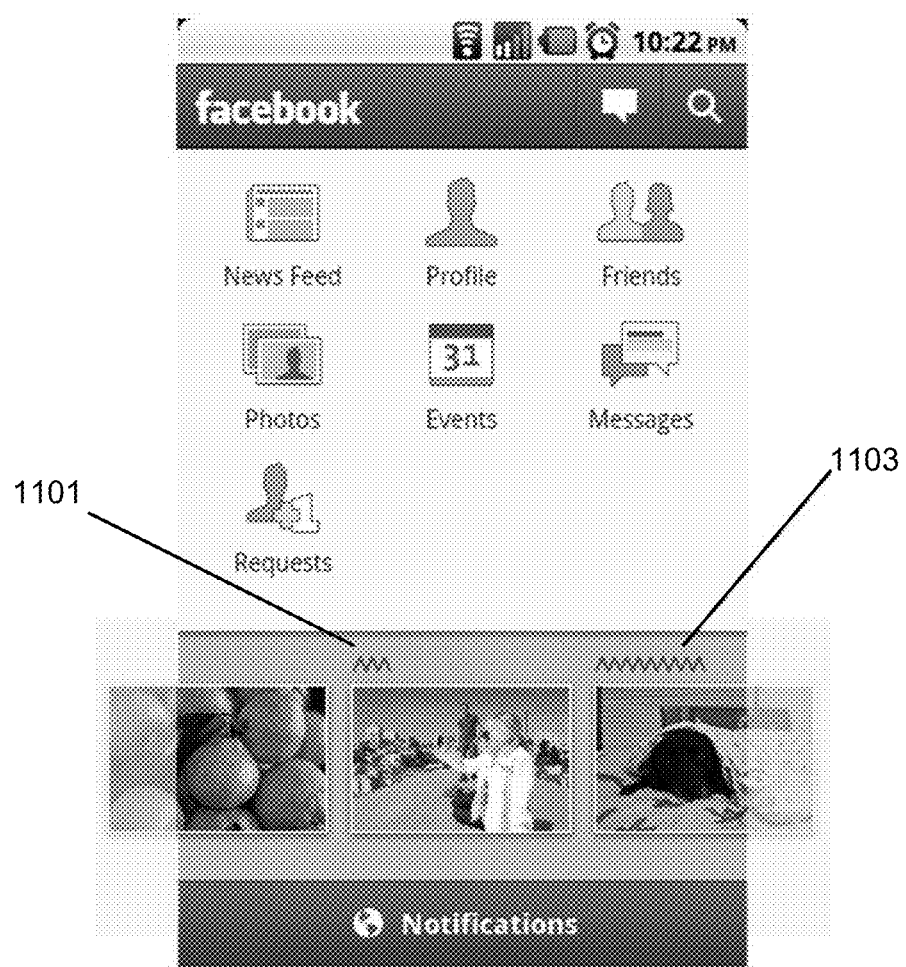
FIG. 11 is a screen view of a user initiated dynamic haptic effect according to one embodiment of the present invention.

FIG. 11 is a screen view of a user initiated dynamic haptic effect according to one embodiment of the present invention. A filmstrip application for displaying or selecting photographs is shown running at the bottom of a handheld or mobile device having a touch sensitive surface and a haptic actuator. By using gestures or device sensor data, a user may scroll the filmstrip from left to right or right to left, and the filmstrip application may then dynamically provide a haptic effect for a first photograph 1101 which is different from a haptic effect for a second photograph 1103 based upon the gestures or device sensor data. Once the user has initiated the selection of a photograph through a gesture, the system may provide an animation to visually show the filmstrip in motion along with a corresponding haptic animation component. Subsequent user gestures or device sensor information received during the filmstrip animation may cause the haptic effect to change along with any associated change in the animation. For example, if the filmstrip animation is moving too slow or too fast, the user may speed it up or slow it down in real time with a gesture and the corresponding haptic effect component will also change dynamically in real time along with the animation.

Figure 12E:
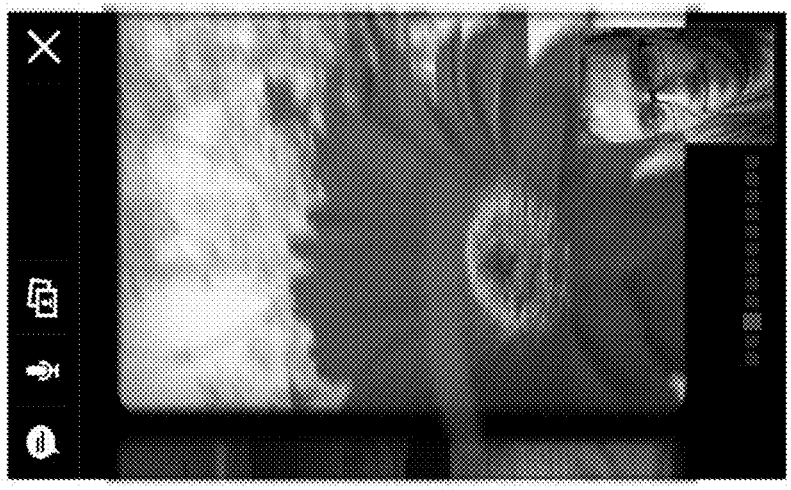

FIGS. 12A-12E are screen views of applying a haptic effect concurrently to multiple devices according to one embodiment of the present invention. FIG. 12A shows a screen view of a haptic enabled handheld or mobile device of a first user 1201, along with a visual thumbnail view of a second user 1203 also having a haptic enabled handheld or mobile device. The first and second devices may be connected in real time via any type of communication link, including but not limited to electronic, cellular, wireless, wi-fi, optical, infrared, acoustic, Bluetooth, USB, Firewire, Thunderbolt or Ethernet.

Figure 12D:
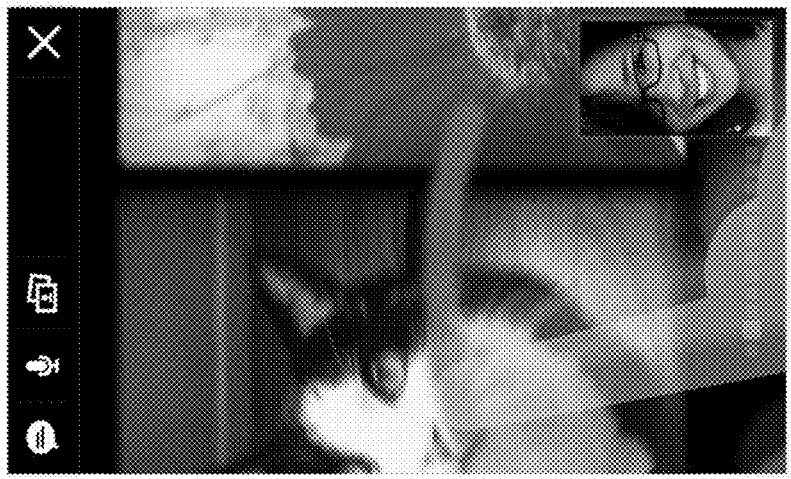

FIG. 12B shows the first user selecting an application to share photographs between the two users. Upon selecting the application, FIG. 12C shows the first photograph in the album, and FIG. 12D shows the first user applying a scrolling gesture to select the second photograph in the album by scrolling the photos from right to left. A corresponding haptic effect is provided to the first user during the scrolling gesture. Because the first and second devices are connected in real time via the communication link, FIG. 12E shows the screen view of the second user which visually shows the same photograph as being displayed concurrently to the first user. Because of the real time link between the two devices, the second user is able to concurrently view the same photos as the first user. The second user also experiences in real time a similar haptic effect for each gesture and photo as provided for the first user. In one embodiment, user gestures and haptic effects generated by the second user may be optionally communicated concurrently to the first user via the communication link, creating a real time bi-directional haptic link between the first and second devices. For example, the first user may scroll to the second photo, the second user may then scroll to the third photo, and so on. It will be recognized that many other types of user gestures, device sensor data and haptic effects may be communicated between two or more devices in real time without limitation.

Figure 13:
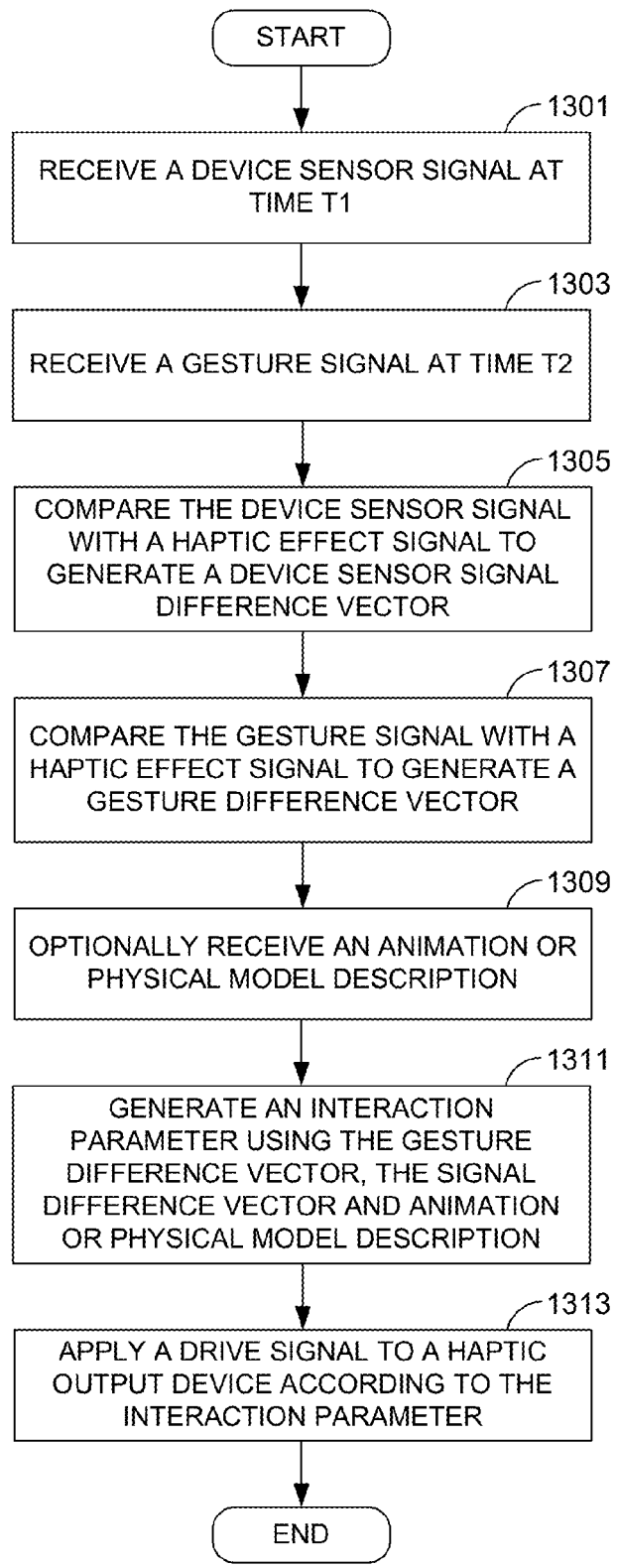
FIG. 13 is a flow diagram for producing a dynamic haptic effect with a gesture signal and a device sensor signal according to one embodiment of the present invention.

FIG. 13 is a flow diagram for producing a dynamic haptic effect with a gesture signal and a device sensor signal according to one embodiment of the present invention. In one embodiment, the functionality of the flow diagram of FIG. 13 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 1301, the system receives input of a device sensor signal at time T1, and at 1303 the system receives input of a gesture signal at time T2. Time T1 and time T2 may occur simultaneously or non-simultaneously with each other and in any order. Multiple additional gesture inputs or device sensor inputs may be used to give greater precision to the dynamic haptic effect or to provide the dynamic haptic effect over a greater period of time. The gesture signals and the device sensor signals may be received in any order or time sequence, either sequentially with non-overlapping time periods or in parallel with overlapping or concurrent time periods. At 1305, the device sensor signal is compared to a haptic effect signal to generate a device sensor difference vector. At 1307, the gesture signal is compared to a haptic effect signal to generate a gesture difference vector. At 1309, an animation or physical model description may optionally be received. At 1311, an interaction parameter is generated using the gesture difference vector, the signal difference vector, and optionally the animation or physical model description. It will be recognized that any type of input synthesis method may be used to generate the interaction parameter from one or more gesture signals or device sensor signals including, but not limited to, the method of synthesis examples listed in TABLE 2 below. At 1313, a drive signal is applied to a haptic actuator according to the interaction parameter.

TABLE 2

METHODS OF SYNTHESIS

Figure 14:
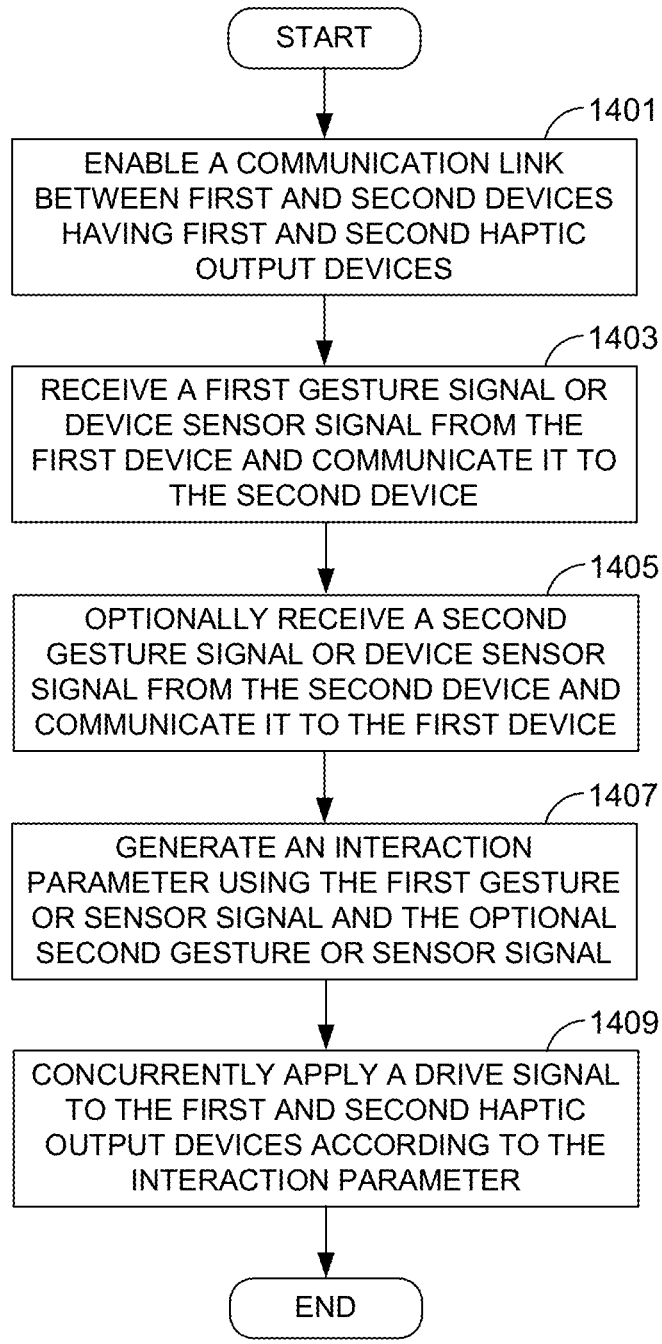
FIG. 14 is a flow diagram for concurrently applying a haptic effect to multiple devices according to one embodiment of the present invention.

Additive synthesis - combining inputs, typically of varying amplitudes
Subtractive synthesis - filtering of complex signals or multiple signal inputs
Frequency modulation synthesis - modulating a carrier wave signal with one or more operators
Sampling - using recorded inputs as input sources subject to modification
Composite synthesis - using artificial and sampled inputs to establish a resultant "new" input
Phase distortion - altering the speed of waveforms stored in wavetables during playback
Waveshaping - intentional distortion of a signal to produce a modified result
Resynthesis - modification of digitally sampled inputs before playback
Granular synthesis - combining of several small input segments into a new input
Linear predictive coding - similar technique as used for speech synthesis
Direct digital synthesis - computer modification of generated waveforms
Wave sequencing - linear combinations of several small segments to create a new input
Vector synthesis - technique for fading between any number of different input sources
Physical modeling - mathematical equations of the physical characteristics of virtual motion FIG. 14 is a flow diagram for concurrently applying a haptic effect to multiple devices according to one embodiment of the present invention. At 1401, the system enables a unidirectional or bidirectional communication link between a first device having a first haptic actuator and a second device having a second haptic actuator. At 1403, the system receives input of a first gesture signal or device sensor signal from the first device and communicates it to the second device via the communication link. At 1405, the system optionally receives input of a second gesture signal or device sensor signal from the second device and communicates it to the first device via the communication link. At 1407, an interaction parameter is generated using the first gesture or device sensor signal and the optional second gesture or device sensor signal. At 1409, a drive signal is concurrently applied to the haptic actuator on the first device and the second haptic actuator on the second device according to the interaction parameter. In one embodiment, the interaction parameter is generated independently on each device. In another embodiment, the interaction parameter is generated once on one device and then communicated to the other device via the communication link.

Figure 15:
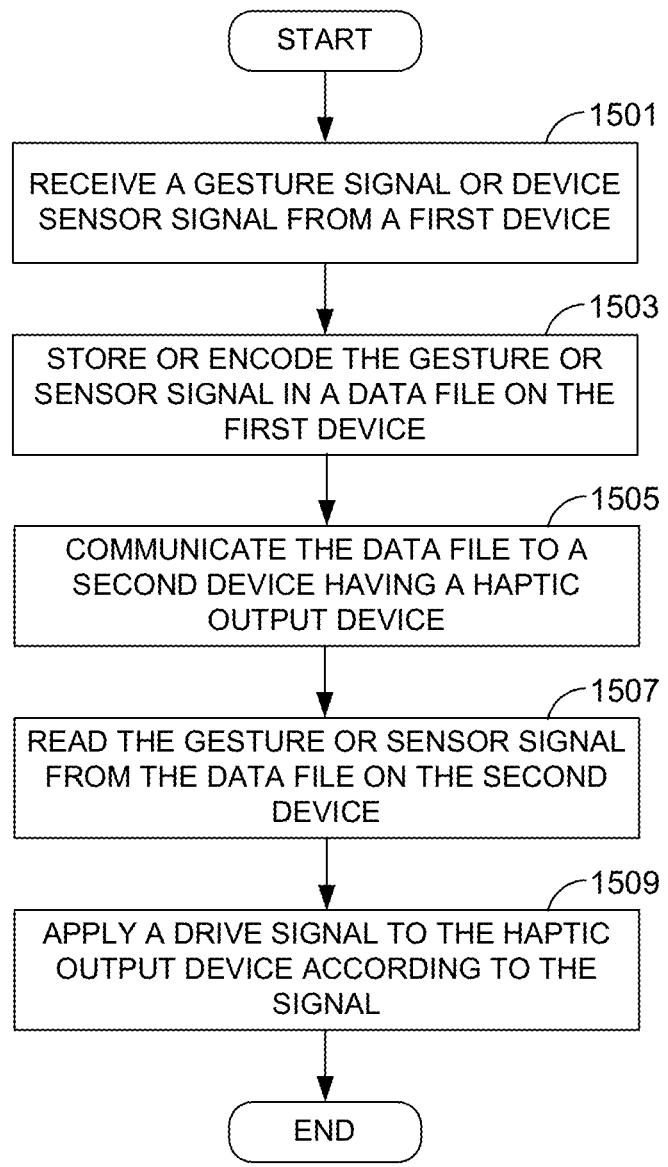
FIG. 15 is a flow diagram for encoding and applying a haptic effect using a data file according to one embodiment of the present invention.

FIG. 15 is a flow diagram for encoding and applying a haptic effect using a data file according to one embodiment of the present invention. At 1501, the system receives input of a gesture signal or device sensor signal from a first device. At 1503, the gesture or device sensor signal is stored or encoded into a data file on the first device. At 1505, the data file is communicated to a second device having a haptic actuator via any file transfer mechanism or communication link. At 1507, the second device reads the stored gesture or device sensor signal from the data file on the second device. At 1509, a drive signal is applied to the haptic actuator on the second device according to the gesture or device sensor signal.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed:

1. A method of producing a haptic effect comprising:
   receiving a first gesture signal;
   receiving a second gesture signal;
   generating a dynamic interaction parameter using the first gesture signal and the second gesture signal; and
   applying a drive signal to a haptic output device according to the dynamic interaction parameter.

2. The method of claim 1 wherein the first or second gesture signal comprises a vector signal.

3. The method of claim 1 wherein the first or second gesture signal comprises an on-screen signal.

4. The method of claim 1 wherein generating a dynamic interaction parameter comprises generating a dynamic interaction parameter from a difference between the first gesture signal and the second gesture signal.

5. The method of claim 1 wherein generating a dynamic interaction parameter comprises generating a dynamic interaction parameter using the first gesture signal and the second gesture signal and a physical model.

6. The method of claim 1 wherein generating a dynamic interaction parameter comprises generating a dynamic interaction parameter using the first gesture signal and the second gesture signal and an animation.

7. The method of claim 1 further comprising:
   receiving a first device sensor signal;
   receiving a second device sensor signal; and
   wherein generating a dynamic interaction parameter comprises generating a dynamic interaction parameter using the first gesture signal and the second gesture signal and the first device sensor signal and the second device sensor signal.

8. The method of claim 1 wherein the first device sensor signal or the second device sensor signal comprises an accelerometer signal.

9. The method of claim 1 wherein the first device sensor signal or the second device sensor signal comprises a gyroscope signal.

10. The method of claim 1 wherein the first device sensor signal or the second device sensor signal comprises an ambient signal.

11. The method of claim 1 wherein the first device sensor signal or the second device sensor signal comprises a virtual sensor signal.

12. A haptic effect enabled system comprising:
   a haptic output device;
   a drive module electronically coupled to the haptic output device for receiving a first gesture signal, receiving a second gesture signal, and generating a dynamic interaction parameter using the first gesture signal and the second gesture signal; and
   a drive circuit electronically coupled to the drive module and the haptic output device for applying a drive signal to the haptic output device according to the dynamic interaction parameter.

13. The system of claim 12 wherein the first or second gesture signal comprises a vector signal.

14. The system of claim 12 wherein the first or second gesture signal comprises an on-screen signal.

15. The system of claim 12 wherein the drive module comprises a drive module for generating a dynamic interaction parameter from a difference between the first gesture signal and the second gesture signal.

16. The system of claim 12 wherein the drive module comprises a drive module for generating a dynamic interaction parameter using the first gesture signal and the second gesture signal and a physical model.

17. The system of claim 12 wherein the drive module comprises a drive module for generating a dynamic interaction parameter using the first gesture signal and the second gesture signal and an animation.

18. The system of claim 12 wherein the drive module comprises a drive module for receiving a first device sensor signal, receiving a second device sensor signal, and generating a dynamic interaction parameter using the first gesture signal and the second gesture signal and the first device sensor signal and the second device sensor signal.

19. The system of claim 12 wherein the first device sensor signal or the second device sensor signal comprises an accelerometer signal.

20. The system of claim 12 wherein the first device sensor signal or the second device sensor signal comprises a gyroscope signal.

21. The system of claim 12 wherein the first device sensor signal or the second device sensor signal comprises an ambient signal.

22. The system of claim 12 wherein the first device sensor signal or the second device sensor signal comprises a virtual sensor signal.

23. A non-transitory computer readable medium having instructions stored thereon that, when executed by a processor, causes the processor to produce a haptic effect, the instructions comprising:
   receiving a first gesture signal;
   receiving a second gesture signal;
   generating a dynamic interaction parameter using the first gesture signal and the second gesture signal; and
   applying a drive signal to a haptic output device according to the dynamic interaction parameter.

24. The non-transitory computer readable medium of claim 23, wherein the first or second gesture signal comprises a vector signal.

25. The non-transitory computer readable medium of claim 23, wherein the first or second gesture signal comprises an on-screen signal.

26. The non-transitory computer readable medium of claim 23, wherein generating a dynamic interaction parameter comprises generating a dynamic interaction parameter from a difference between the first gesture signal and the second gesture signal.

27. The non-transitory computer readable medium of claim 23, wherein generating a dynamic interaction parameter comprises generating a dynamic interaction parameter using the first gesture signal and the second gesture signal and a physical model.

28. The non-transitory computer readable medium of claim 23, wherein generating a dynamic interaction parameter comprises generating a dynamic interaction parameter using the first gesture signal and the second gesture signal and an animation.

29. The non-transitory computer readable medium of claim 23, further comprising:
   receiving a first device sensor signal;
   receiving a second device sensor signal; and
   wherein generating a dynamic interaction parameter comprises generating a dynamic interaction parameter using the first gesture signal and the second gesture signal and the first device sensor signal and the second device sensor signal.

30. The non-transitory computer readable medium of claim 23, wherein the first device sensor signal or the second device sensor signal comprises a signal selected from the list consisting of accelerometer, gyroscope, ambient, or virtual.

* * * * *